J. Drummond.
Inclined Railroad.
Nº 1,184. Patented Jun. 21, 1839.
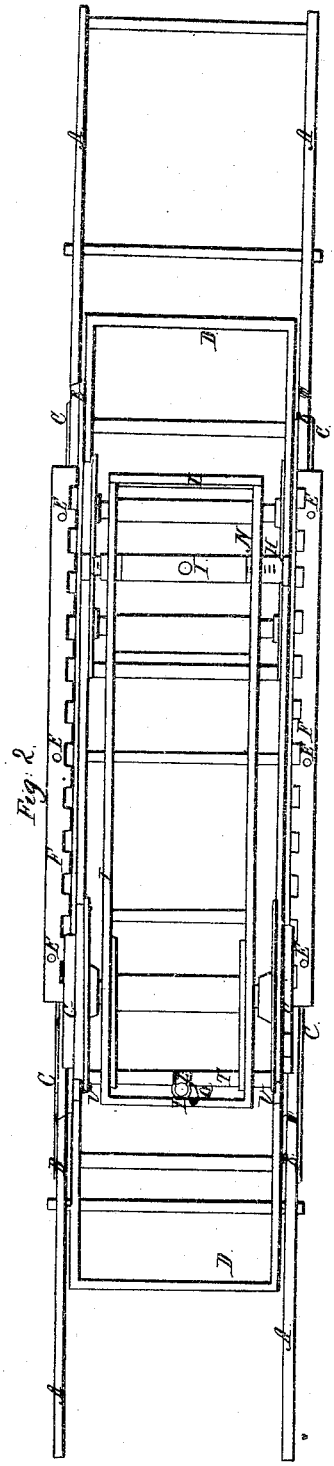
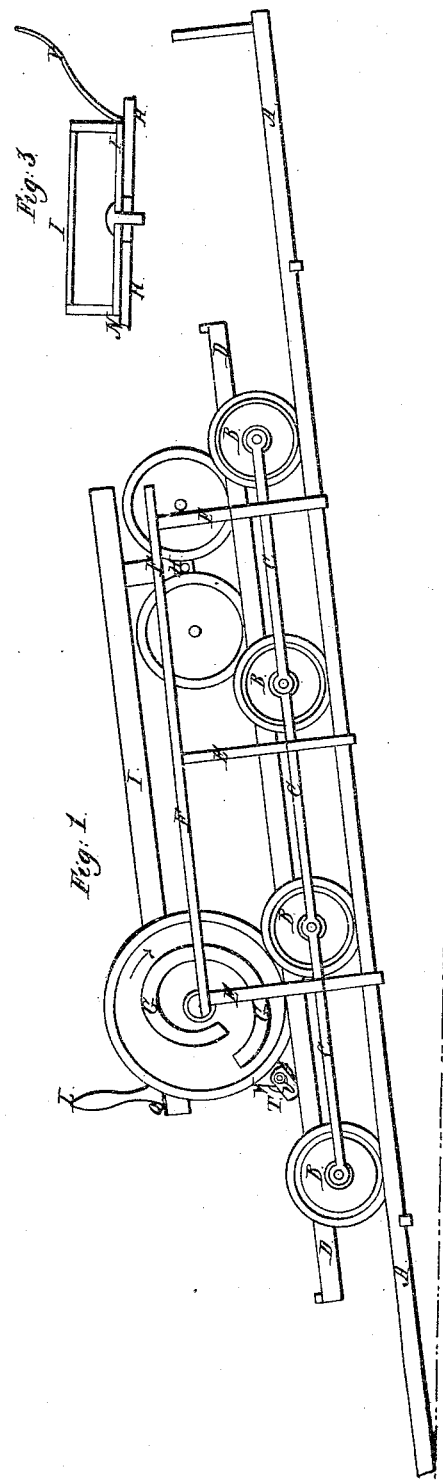

UNITED STATES PATENT OFFICE.

JOHN DRUMMOND, OF ELIZABETHTOWN, NEW JERSEY.

MODE OF ASCENDING AND DESCENDING INCLINED PLANES ON RAILROADS.

Specification of Letters Patent No. 1,184, dated June 21, 1839.

*To all whom it may concern:*

Be it known that I, JOHN DRUMMOND, of Elizabethtown, Essex county, State of New Jersey, have invented a new and useful Improvement in the Construction of Railways and Locomotives for Ascending and Descending Inclined Planes, which is described as follows, reference being had to the annexed drawings of the same, making part of this specification.

Figure 1 is a side view of the machine. Fig. 2 is a top view. Fig. 3, section of the slide.

Similar letters refer to similar parts in the figures.

The nature of this invention consists in depressing the track A at the inclined plane, about sixteen inches below the level of the main track on which the cars travel, and increasing it in width at said inclined plane about two feet. On the inclined plane are placed several pairs of antifriction wheels B connected together at the sides by connecting rods C on the ends of their axles extending from one to the other. On the axles of these antifriction wheels is placed a movable track or frame D to receive the locomotive engine and train of cars, the top of which is to be on a level with the main track. The cross ties of the track at the inclined plane are extended beyond the rails a sufficient distance so that a series of posts E can be mortised, tenoned and braced thereto on each side. On the top of said posts is placed a cogged rail F—one on each side—the cogs being on the inside of the rail. On the outside of each driving wheel of the locomotive is secured a worm G which works into, or engages with, said cogged rail or rack F.

On the frame of the leading trucks is placed a slide H on which the frame I of the engine rests at the forward end for changing the position of the hind or driving wheels obliquely in order to bring the worms into gear with the racks, which is done by the engineer who moves the forward end of the engine frame to the right or left which may be accomplished by a lever P, or by any suitable mechanical contrivance, the driving wheels being, at the same time, raised from the track, which is also done by a lever L by the engineer or by a screw, which wheels will remain stationary, either by props, or by securing the lever by a hook Q or otherwise.

The locomotive engine and train being on the track or movable frame on the axles of the trucks the engineer moves the end of the engine frame to the right or left and the lever at the hind end being also moved raises the driving wheels from the track and brings the worms on said wheels into gear with the side racks—the hind axle or driving wheels being propped—the motion of the engine will cause the trucks with the movable track and locomotive engine, train, &c., thereon to ascend the inclined plane. When the train, and so forth, is at the head of the inclined plane the lever is moved by the engineer, which throws the engine out of gear with the tracks, when the locomotive and train will move onward.

As it may not be clearly understood from the foregoing description how the worm is formed and how it acts on the rack I will add a further description. The outer end of the worm, or that which is farthest from the center of the driving wheel to which it is fastened, is placed near the tread of said wheel and forms a spiral curve gradually approaching the center and thus continues beyond the starting point one or more inches—the inward inclination agreeing with the rack on the side rail—that is to say—I make the cogs on the rack of one foot pitch, or one cog and one space to every foot in length on the rail, and thus the inclination of the worm inward being one foot it will therefore correspond and fit the rack—the space between the cogs and the thickness of the worm being nearly the same, while the thickness of the cogs and the space between the ends of the worm are the same. Now the rack and worm being thus formed and the engine in motion the worm, at every revolution, will take hold of a new cog. The inner end of the worm, or that which is nearest the center leaving the first cog immediately after the outer end of the worm, or that which is farthest from the center, takes hold of the second cog, or the one next in advance of the first; and so on with all the cogs until the ascent is overcome—the inside of the spiral or worm, in this case, acting on the cog. This description applies to the right hand side of the engine. On the opposite, or left hand, side of the engine the outside of the spiral or worm acts on the cogs. In this case the inner end of the worm takes hold of a cog while the outer end is three cogs in advance. In bringing the worms into gear with the racks it is first necessary to advance the engine between the racks in a straight line and when the outer end of the right hand worm is opposite the first space the engine frame is thrown to the right which brings the worm into said first space. The engine in this position then advances and the driving wheels having performed three revolutions the inner end of the left worm takes into the first notch or space on the opposite or left side—the outer end being three cogs in advance. The engine then advances, the driving axle remaining in its oblique position until it arrives at the top of the inclined plane. The engine frame is then brought parallel with the track and the axle at right angles to it when the engine with its train travels forward on the main track. The same operation takes place in descending.

It should be stated that there is a row of notches N or depressions in the top of the slide on which the engine frame moves, to admit the lower end of the lever P by which said frame is moved to the right or left—said lever being applied in the manner of other levers—that is to say one end of it is placed in a notch—the side of the lever resting against the side of the frame—the engineer then moves the other end of the lever toward the engine frame which thus moves it on the slide. In relation to the operation of the other lever, or that at the rear end of the engine frame, for raising the driving wheels from the track, it may be well to state that this lever is inserted into a horizontal axle T with cams U, which, as the long end of the lever L is raised or brought against the end of the frame I, bear upon the track and cause the engine at this end to rise, and the lever being hooked or otherwise fastened, it will be held in this position. The ends of said horizontal axle turn in boxes V fastened to the engine frame I.

The invention claimed and desired to be secured by Letters Patent consists—

1. In the mode of ascending and descending inclined planes of rail ways as before described—that is to say—by means of worms fastened on the driving wheels of the locomotive engine working into raised stationary racks constructed at the sides of the inclined plane, thrown in and out of gear by making the forward end of the engine frame to slide on the truck frame; whether constructed in the manner before described, or in any other mode substantially the same.

2. Also the arrangement of the series of truck wheels moving on the depressed track at the inclined plane in combination with the movable track on the axles of said trucks, all as before described.

JOHN DRUMMOND.

Witnesses:
Wm. P. Elliot,
Ed. Maher.